H. P. GALLUP.
WINDMILL.

No. 63,498.                      Patented Apr. 2, 1867.

United States Patent Office.

H. P. GALLUP, OF MEDINA, MICHIGAN.

*Letters Patent No. 63,498, dated April 2, 1867; antedated March 21, 1867.*

IMPROVEMENT IN WINDMILLS.

*The Schedule referred to in these Letters Patent and making part of the same.*

TO ALL WHOM IT MAY CONCERN:

Be it known that I, H. P. GALLUP, of Medina, Lenawee county, State of Michigan, have invented a new and useful Improvement in Windmill; and I do hereby declare that the following is a full, clear, and exact description thereof, which will enable others skilled in the art to make and use the same, reference being had to the accompanying drawing, forming part of this specification, in which—

Similar letters of reference indicate like parts.

My invention has for its object to furnish an improved wind mill, simple in construction, cheap, durable, and strong, and easily regulated to run fast or slow, as desired; and it consists, first, in the form and construction of the wind-wheel; second, in the combination with the wind-wheel of inclined air-passages; and third, in the combination, with the air-passages, of doors by means of which the amount of wind admitted to the wind-wheel, and consequently its velocity, may be regulated at pleasure.

Figure 1:
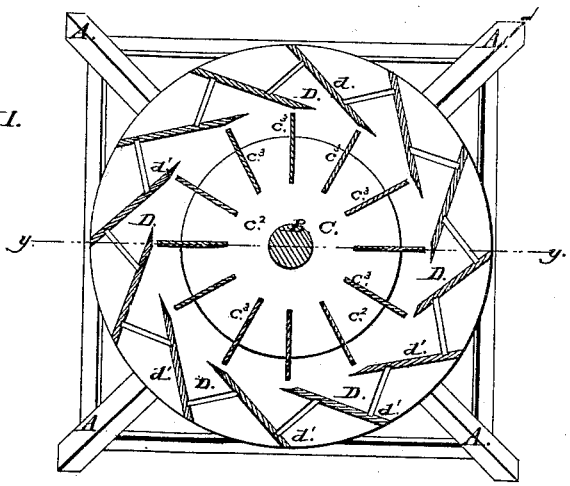
Figure 1 is a horizontal section of my improved windmill, taken through the line $x\ x$, fig. 2.
Figure 2:
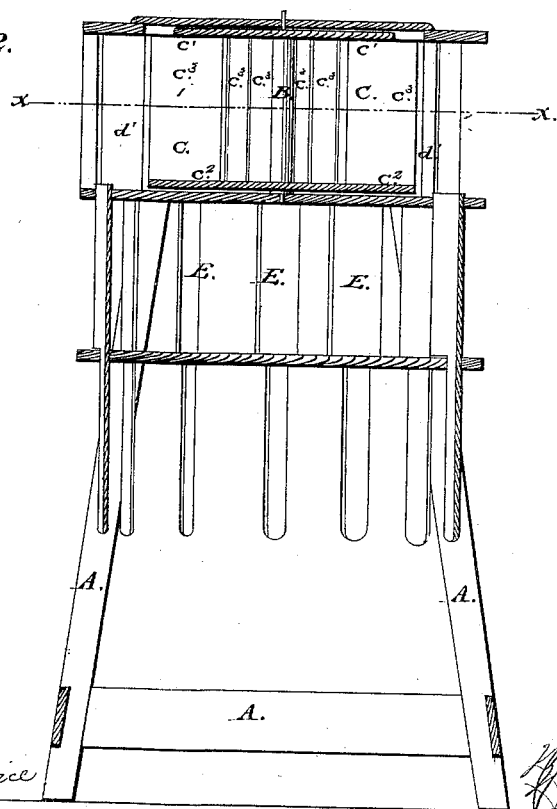
Figure 2 is a vertical section of the same, taken through the line $y\ y$, fig. 1.

The frame A represents the building or tower, upon the top of which the wind-wheel is placed. The wind-chamber is circular in form, and through its centre passes the vertical shaft B, to which the wind-wheel C is attached. This shaft should pass down vertically through the various stories of the building, and may have machinery attached to it in all or any number of the stories desired. $c^1$ and $c^2$ are two circular disks attached to the shaft B; the upper disk, $c^1$, near the ceiling, and the lower one, $c^2$, near the floor of the wind-chamber, as shown in fig. 2. The diameter of these disks, or of the wind-wheel, should be about two-thirds the diameter of the air-chamber. The vertical fans $c^3$ are set radially, as shown in fig. 1, and are securely attached to the disks $c^1$ and $c^2$ by being secured in grooves formed in the surfaces of said disks, or in any other strong and convenient manner. The wind enters the air-chamber through the air-passages D. These passages are formed by the vertical division plates $d$,' the ends of which are attached to the floor and ceiling of the air-chamber. The air-passages D are so arranged that the wind, passing through them to the wind-wheel C, shall strike the fans $c^3$ in such a direction that its force will be wholly expended in imparting motion to the said wind-wheel C. E are doors, closing the air-passages D when required. In the drawings they are represented as being slide doors, sliding in grooves formed in the surfaces of the division plates $d$;' but they may be hinged and operated by ropes and weights extending down into the lower stories of the building, if desired. By means of these doors, the amount of wind admitted to the wind-wheel C may be regulated according to the force with which it blows, and the motion of the machinery may thus be regulated as desired.

By thus constructing my wind-wheel of fans on the circumference of the wind-wheels, and not connected by radial arms with the shaft of the wind-wheel, the wheel is rendered lighter and much more easily turned, a great desideratum in wind-wheels.

I do not claim the employment of fans arranged on the circumference of the wind-wheel when said fans are connected with the wind-wheel shaft by radial arms; but what I do claim as my invention, and desire to secure by Letters Patent, is—

1. The wind-wheel C, with arms $c^3$ fitted in grooves, constructed and arranged in the wind-chamber, substantially as described and for the purpose set forth.

2. The combination with the wind-wheel C of the inclined wind-passages D, substantially as described and for the purpose set forth.

3. The combination, with the air-passages D, of doors E, substantially as described and for the purpose set forth.

H. P. GALLUP.

Witnesses:
GEORGE H. WILBER.
JOHN LAMAN.